April 1, 1958 H. L. FOOTE ET AL 2,829,308

COLD-CATHODE BINARY DECADE COUNTER

Filed Nov. 16, 1955

INVENTORS.
HOWARD L. FOOTE
GERALD R. PAUL
BY
AGENT 2,829,308
Patented Apr. 1, 1958

2,829,308

COLD-CATHODE BINARY DECADE COUNTER

Howard L. Foote, Fairport, and Gerald R. Paul, Webster, N. Y., assignors to General Dynamics Corporation, a corporation of Delaware Application November 16, 1955, Serial No. 547,224
4 Claims. (Cl. 315—84.5)

Our invention relates to counting circuits, and more particularly to binary decade counting circuits.

A binary counter usually comprises a plurality of bistable, inherently binary stages connected in tandem. Each stage contains a "—" and a "+" device, the symbols referring to the two counts which a binary counter can register and to the particular one of the devices which is operative during registration of a given count. Thus each stage of a binary decade counter may include a "—" and a "+" gaseous discharge device respectively connected to a suitable source of unidirectional potential. Before counting, the "—" discharge device alone may be arranged to conduct. On the count of 1, the "+" discharge device conducts and cuts off the "—" device, while on the count of 2, the "—" discharge again conducts and turns off the "+" device. The counter is then ready to count again. Counters are usually arranged to count pulses received from a convenient pulse source.

Four binary stages are required for decimal counting. However, since the full count of four stages is 16, and since a binary counter does not return to zero count until full, some expedient is necessary to return a binary decade counter to zero count when the 10th, rather than the 16th, pulse is received. Binary decade counters of the prior art employ extra-pulse inserters or pulse feedback paths to produce this effect. Such counters deviate from true binary count for at least one decimal digit, usually 8 or 9. Deviations may not be objectionable for some uses, but where gaseous discharge devices are used so that the progress of the count may be observed, it is highly desirable that true binary count be employed. Otherwise, the observer must refer to a table or to his memory, and may therefore make errors or read too slowly.

It is accordingly an object of our invention to provide a binary decade counter of new and useful configuration.

It is another object of our invention to provide a binary decade counter in which the count progresses in true binary fashion.

It is a further object of our invention to provide a binary decade counter in which actual binary count may be read by observation of gaseous discharge devices.

In general, we accomplish the foregoing and other objects of our invention by providing means for developing a bias voltage in the "+" discharge device of the fourth binary stage and applying this bias to the "+" discharge device in the second stage to prevent conduction in the latter, and also by providing a connection from the output means of the first stage to an additional input means of the fourth stage.

Figure 1:
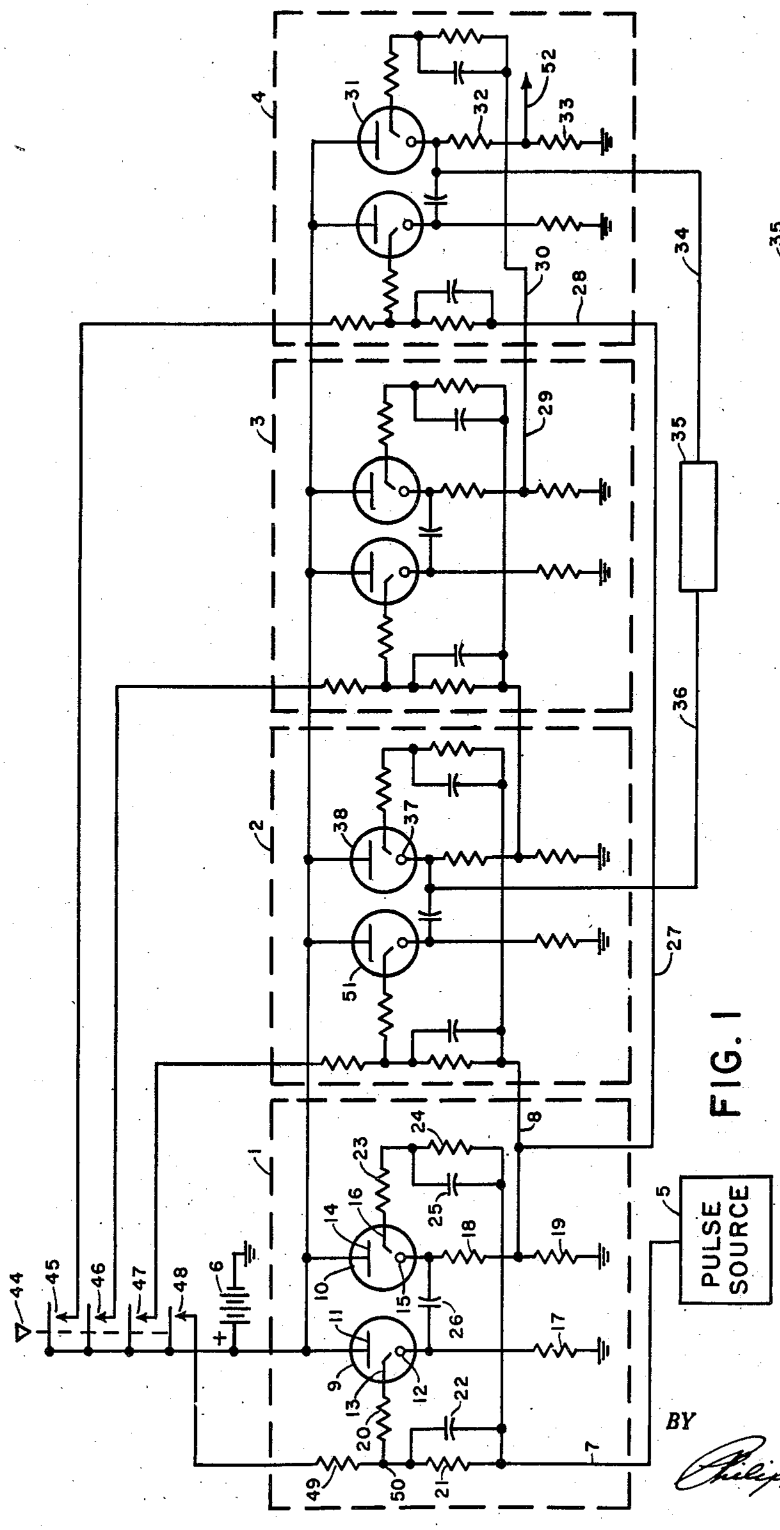
Figure 3:
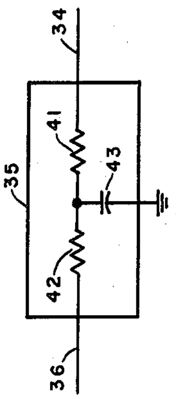
Figure 2:
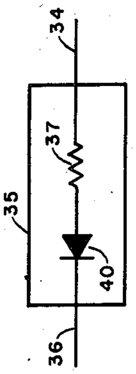

Further objects and advantages of our invention will become apparent as the following description proceeds, and the features of novelty which characterize our invention will be pointed out with particularity in the claims annexed to and forming a part of this specification. For a better understanding of our invention, reference may be had to accompanying drawings in which:

Fig. 1 shows a schematic wiring diagram of a preferred embodiment of our invention; and Figs. 2 and 3 show alternate forms of attenuation networks suitable for use in the embodiment of Fig. 1.

Referring now to Fig. 1, a plurality of stages, indicated by symbols 1, 2, 3 and 4, are connected in tandem and are fed from pulse source 5. A convenient source of unidirectional potential, such as battery 6, energizes each of the stages in parallel.

In the case of stage 1, an input means, such as lead 7, and an output means such as lead 8, are provided. Two discharge devices, preferably of the cold cathode gaseous type, are indicated respectively by 9 and 10. Discharge device 9 is the "—" device and has an anode 11, a cathode 12, and a starting anode 13, while discharge device 10, the "+" device, has an anode 14, a cathode 15, and a starting anode 16. Cathode 12 is returned to ground through resistor 17; cathode 15 is returned to ground through resistors 18 and 19 in series. Input lead 7 is connected to starting electrode 13 through resistors 20 and 21 in series, the latter being bypassed by capacitor 22 for improved high frequency response. Similarly, starting anode 16 is connected to input lead 7 through resistors 23 and 24 in series, the latter being bypassed by capacitor 25 for the same reason. Cathodes 12 and 15 are coupled by capacitor 26.

Stages 2 and 3 are identical in configuration in stage 1, and stage 4 is identical except for the provision, in accordance with our invention, of an additional connection, as by means of lead 27, from output means 8 of stage 1 to an additional input means 28 of stage 4, and the feeding of the output of stage 3 appearing at output means 29 to the input means 30 of "+" device 31 in stage 4. Further in accordance with our invention, series resistors 32 and 33 provide a means of developing a bias when "+" device 31 is operative, i. e., conducting. This bias may be applied from bias output lead 34 through attenuation means 35 and lead 36 to the cathode 37 of "+" device 38 in stage 2.

Attenuation means 35 preferably includes a series combination of resistance means, such as resistor 39, and rectifier means, such as diode 40, as shown in Fig. 2. However, attenuation means 35 may instead comprise a low-pass filter, as shown in Fig. 3, including series resistors 41 and 42 and shunt capacitor 43; other attenuation networks may readily be substituted by those skilled in the art.

We also provide means for "priming" all "—" tubes "on." This means may conveniently be a push-button 44 arranged upon depression simultaneously to close contacts 45, 46, 47 and 48. Contacts 45 make a circuit between the positive terminal of battery 6 through resistor 49 to the junction 50 between resistors 20 and 21. Contacts 46, 47 and 48 are similarly arranged in, and perform the same function for, stages 2 to 4 respectively.

The cold cathode gaseous discharge devices indicated in the illustrated embodiment of our invention are preferably of the standardized commercial type known in the art as type 5823. Tubes of this type have a striking potential of 290 volts between main anode and cathode, but only 75 volts between starting anode and cathode. When conduction is initiated between the starting anode and cathode, conduction between main anode and cathode may be initiated and maintained with a potential difference as little as 85 volts. Once conduction has occurred between main anode and cathode, the starting anode has no control over the main discharge path.

In operation, all "—" tubes may be primed "on" by depressing push-button 44. This action applies sufficient battery voltage to starting anode 13 to initiate a discharge in the starting anode path. Since battery voltage is standing on anode 11, a discharge is set up in the main anode path, and "—" tube 9 conducts. Similar action occurs in each of stages 2, 3 and 4. Conduction in discharge device 9 cuts off current flow in device 10 because current flow through cathode resistor 17 is communicated through coupling capacitor 26 to cathode 15. If the latter happens to be conducting when push-button 44 is depressed, the potential from resistor 17 added to that appearing across resistors 18 and 19 is sufficient to reduce the potential difference between anode 14 and cathode 15 below the level necessary to sustain conduction, and discharge device 10 is consequently extinguished. If discharge device 10 is already non-conductive, closure of contacts 48 naturally produces no effect, since the desired condition is already in existence.

Pulse source 5 may be arranged to supply positive-going pulses over lead 7 to both starting anode 13 and starting anode 16. Since discharge device 9 is conducting as a result of the priming operation, the first pulse received produces no effect on discharge device 9. The same pulse raises the potential of starting anode 16 sufficiently above that of cathode 15 to cause conduction, in turn causing a main-path discharge between anode 14 and cathode 15. Resulting current flow through resistors 18 and 19 in series produces a voltage drop which is communicated through capacitor 26 to cathode 12 of discharge device 9. This drop added to the voltage drop across resistor 17 is sufficient to extinguish discharge device 9. Output lead 8 is connected to the junction between resistors 18 and 19, and therefore the resulting pulse on this lead is of insufficient magnitude to cause any effect on the succeeding stage.

Upon receipt of the second pulse from pulse source 5, conduction is switched back to discharge device 9. In this case, the same mechanism of operation is in effect. When the starting anode-to-cathode potential in "—" tube 9 rises due to the presence of a pulse on starting anode 13, the main discharge path is activated between main anode 11 and cathode 12. The resulting voltage drop across resistor 17 is fed through capacitor 26 to the cathode of discharge device 10 to cut the latter off.

The voltage now appearing on output lead 8 is higher than that previously experienced because capacitor 26 has become charged during the time that "+" tube 10 was conducting. When discharge device 10 is extinguished and discharge device 9 is activated by the second pulse, the charge voltage is added to the drop across series resistors 18 and 19, and both of these voltages are applied to cathode 15. The resultant higher voltage across resistors 18 and 19 is sufficient, in spite of the fact that these resistors form a voltage divider, for lead 8 to be at a sufficiently high potential to cause "+" tube 38 in stage 2 to be ignited, and "—" tube 51 to be extinguished. Thus, upon receipt of the second pulse, output lead 8 carries a single output pulse to switch conduction in stage 2 from the "—" to the "+" tube. The process of alternate conduction between "—" and "+" tubes in response to successive input pulses occurs in each of the succeeding stages of the counter.

The count proceeds in normal fashion through the count of 9, as indicated in the following table, the particular discharge device of each stage conducting after receipt of a given pulse being indicated by "+" or "—":

| | Stage 1 | Stage 2 | Stage 3 | Stage 4 |
|---|---|---|---|---|
| Prime | "—" | "—" | "—" | "—" |
| Pulse 1 | "+" | "—" | "—" | "—" |
| Pulse 2 | "—" | "+" | "—" | "—" |
| Pulse 3 | "+" | "+" | "—" | "—" |
| Pulse 4 | "—" | "—" | "+" | "—" |
| Pulse 5 | "+" | "—" | "+" | "—" |
| Pulse 6 | "—" | "+" | "+" | "—" |
| Pulse 7 | "+" | "+" | "+" | "—" |
| Pulse 8 | "—" | "—" | "—" | "+" |
| Pulse 9 | "+" | "—" | "—" | "+" |

It will be noted that the change of conduction from the "+" to the "—" device upon receipt of the second pulse applies a drive pulse not only to stage 2 but also to "—" tube 45 in stage 4 over additional connection 27. This is without effect, since the "—" device 45 is already conducting.

The 8th input pulse switches stage 3 from "+" to "—" to provide a drive pulse to switch conduction in stage 4 from "—" tube 45 to "+" tube 31. However, conduction in "+" device 31 develops a bias across series resistors 32 and 33 in stage 4, and this bias is applied through attenuation means 35 to the cathode 37 of "+" device 38 in stage 2. This prevents conduction in the latter because the bias is of greater magnitude than the input pulse. Therefore, upon receipt of the tenth pulse, stage 1 reverts from "+" to "—," but stage 2 stays in the "—" conduction condition rather than switching as occurred on the receipt of the second pulse. On the other hand, conduction in stage 4 is switched from the "+" to the "—" device over lead 28. After receipt of the tenth pulse, then, conduction occurs in the "—" device of each stage. Since this is the prime condition, it may be seen that the tenth pulse performs the same function as priming and the counter is ready to start the next count. The change in conduction in stage 4 from the "+" tube back to the "—" tube develops a pulse at the junction of resistors 32 and 33 which appears on lead 52 and which can be used to drive counters in succeeding decades.

While we have shown and described our invention as applied to a specific embodiment thereof, other modifications will readily occur to those skilled in the art. We do not, therefore, desire our invention to be limited to the specific arrangement shown and described, and we intend in the appended claims to cover all modifications within the spirit and scope of our invention.

What is claimed is:

1. In a binary decade counting circuit, the combination of a source of pulses to be counted; a plurality of bistable, inherently binary counting stages each having a "+" and "—" device; input means connected to each said "—" device, additional input means connected to said "+" device of the fourth said stage, and output means connected to each said "+" device, the input means of the first of said stages being connected to said pulse source and the input means of each of the other said stages being connected to the output means of the respectively preceding one of said stages; a connection from the output means of the first said stage to said additional input means of the fourth said stage; means including said "+" device of the fourth said stage for developing a bias only when said "+" device is operative; and means for applying said bias to said "+" device in the second said stage to prevent the operation thereof, whereby said counting circuit counts to 9 in true binary fashion and returns to binary zero on the count of 10.

2. The combination of claim 1 in which said "+" and "—" devices are of the gaseous discharge type.

3. The combination of claim 2 in which said gaseous discharge devices are of the cold cathode type.

4. The combination of claim 1 in which said means for applying said bias includes an attenuation network.

References Cited in the file of this patent

UNITED STATES PATENTS

| | | |
|---|---|---|
| 2,541,041 | Crenshaw | Feb. 13, 1951 |
| 2,583,102 | Holden | Jan. 22, 1952 |
| 2,584,363 | Mumma | Feb. 5, 1952 |
| 2,584,811 | Phelps | Feb. 5, 1952 |
| 2,594,742 | Dickinson | Apr. 29, 1952 |
| 2,620,440 | Baker et al. | Dec. 2, 1952 |

UNITED STATES PATENT OFFICE
CERTIFICATE OF CORRECTION

Patent No. 2,829,308

April 1, 1958

Howard L. Foote et al.

It is hereby certified that error appears in the printed specification of the above numbered patent requiring correction and that the said Letters Patent should read as corrected below.

Column 1, line 29, for "discharge" read -- device --.

Signed and sealed this 15th day of July 1958.

(SEAL)
Attest:

KARL H. AXLINE
Attesting Officer

ROBERT C. WATSON
Commissioner of Patents